US012743803B2

(12) United States Patent
Heide et al.

(10) Patent No.: US 12,743,803 B2
(45) Date of Patent: Sep. 22, 2026

(54) METHOD AND SYSTEM FOR DEPTH ESTIMATION USING CROSS-SPECTRAL GATED-RGB STEREO

(71) Applicant: Torc Robotics, Inc., Blacksburg, VA (US)

(72) Inventors: Felix Heide, New York City, NY (US); Mario Bijelic, Frankfurt (DE); Samuel Brucker, Hardthausen am Kocher (DE)

(73) Assignee: Torc Robotics, Inc., Blacksburg, VA (US)

( * ) Notice: Subject to any disclaimer, the term of this patent is extended or adjusted under 35 U.S.C. 154(b) by 226 days.

(21) Appl. No.: 18/780,039

(22) Filed: Jul. 22, 2024

(65) Prior Publication Data

US 2026/0024222 A1 Jan. 22, 2026

(51) Int. Cl.
*G06T 7/593* (2017.01)
*G06V 10/141* (2022.01)
*G06V 10/44* (2022.01)
*G06V 10/80* (2022.01)

(52) U.S. Cl.
CPC ............ *G06T 7/593* (2017.01); *G06V 10/141* (2022.01); *G06V 10/44* (2022.01); *G06V 10/806* (2022.01); *G06T 2207/20208* (2013.01)

(58) Field of Classification Search
CPC ........... G06T 7/593; G06T 2207/10012; G06T 2207/10024; G06T 2207/20221; G06V 10/806
See application file for complete search history.

(56) References Cited

U.S. PATENT DOCUMENTS 10,325,163 B2 6/2019 Perez Barrera et al.
10,346,925 B2 7/2019 Perl et al.
10,382,742 B2 8/2019 Retterath
10,783,384 B2 9/2020 Auner
11,117,594 B2 9/2021 Murad et al.
11,714,420 B2 8/2023 Batur
(Continued)

OTHER PUBLICATIONS

Walz, NPL article "Gated Stereo: Joint Depth Estimation from Gated and Wide-Baseline Active Stereo Cues", Arxiv.Org., Cornell University Library, Cornell University, Ithaca, Ny 14853, Published online on May 22, 2023, (Year: 2023).*
(Continued)

*Primary Examiner* — Yuzhen Shen
(74) *Attorney, Agent, or Firm* — Armstrong Teasdale LLP

(57) ABSTRACT

The system related to a gated camera stereo system, a red-clear-clear-blue (RCCB) camera, at least one memory, and at least one processor communicatively coupled with the at least one memory. The processor is configured to: control the gated camera stereo system to emit a pulse of light at a predetermined wavelength, control a detector of the gated camera stereo system to capture light reflected from a scene after a preset time delay, The processor embeds depth data into two-dimensional gated images using a gate function based upon the captured light by the detector of the gated camera stereo system, control the RCCB camera to capture passive high dynamic range (HDR) images, extract features corresponding to the gated images and the passive HDR images, and fuse the extracted features corresponding to the gated images and the passive HDR images by cross-spectral matching for depth estimation.

20 Claims, 14 Drawing Sheets

(56) References Cited

U.S. PATENT DOCUMENTS

| | | | | |
|---|---|---|---|---|
| 11,872,999 | B2 | 1/2024 | She et al. | |
| 12,307,778 | B1 * | 5/2025 | Xu | G06V 20/54 |
| 2007/0221849 | A1 * | 9/2007 | Tabirian | G01S 17/89<br>250/341.1 |
| 2021/0142055 | A1 * | 5/2021 | Broggi | G08B 13/19656 |
| 2023/0331230 | A1 | 10/2023 | Malaran et al. | |
| 2024/0034109 | A1 | 2/2024 | Whinnery | |

OTHER PUBLICATIONS

Brucker, NPL article "Cross-spectral Gated-RGB Stereo Depth Estimation", arxiv.org., Cornell University Library, Cornell University, Ithaca, NY 14853, Published online on May 21, 2024, (Year: 2024).*

* cited by examiner

900

| | Method | Modality | Train | RMSE [m] | ARD | MAE [m] | $\delta_1$ [%] | $\delta_2$ [%] | $\delta_3$ [%] |
|---|---|---|---|---|---|---|---|---|---|
| | Test Data - Night (Evaluated on LiDAR Ground-Truth Points) | | | | | | | | |
| COMPARISON TO STATE-OF-THE-ART | Gated2Depth | Mono-Gated | D | 16.15 | 0.17 | 8.07 | 75.70 | 92.74 | 96.47 |
| | Gated2Gated | Mono-Gated | MG | 14.08 | 0.19 | 7.95 | 79.84 | 92.95 | 96.59 |
| | PackNet | Mono-RGB | M | 17.82 | 0.20 | 10.21 | 66.35 | 87.85 | 95.61 |
| | Monodepth2 | Mono-RGB | M | 18.44 | 0.18 | 9.47 | 75.70 | 90.46 | 95.48 |
| | SimIPU | Mono-RGB | D | 15.78 | 0.18 | 8.71 | 76.25 | 90.84 | 96.44 |
| | AdaBins | Mono-RGB | D | 14.45 | 0.15 | 7.58 | 81.47 | 93.75 | 97.39 |
| | DPT | Mono-RGB | D | 12.15 | 0.12 | 6.31 | 85.38 | 95.94 | 98.42 |
| | DepthFormer | Mono-RGB | D | 12.15 | 0.11 | 6.20 | 85.18 | 95.76 | 98.47 |
| | PSMNet | Stereo-RGB | D | 27.98 | 0.27 | 16.02 | 50.77 | 74.77 | 85.93 |
| | STTR | Stereo-RGB | D | 20.99 | 0.19 | 11.14 | 70.84 | 87.70 | 93.46 |
| | HSMNet | Stereo-RGB | D | 12.42 | 0.09 | 5.87 | 88.41 | 96.08 | 98.50 |
| | ACVNet | Stereo-RGB | D | 11.70 | 0.08 | 5.25 | 89.91 | 96.33 | 98.47 |
| | RAFT-Stereo | Stereo-RGB | D | 10.89 | 0.09 | 5.10 | 90.47 | 96.71 | 98.64 |
| | CS-Stereo | RCCB-NIR | D | 21.35 | 0.20 | 11.48 | 72.73 | 89.71 | 95.58 |
| | UCSSM | RCCB-NIR | D | 18.22 | 0.27 | 14.63 | 64.51 | 87.12 | 94.27 |
| | CREStereo | Stereo-RCCB | D | 12.05 | 0.10 | 5.18 | 88.48 | 94.12 | 97.26 |
| | Gated Stereo | Stereo-Gated | DGS | 6.39 | 0.05 | 2.25 | 96.40 | 98.44 | 99.24 |
| | **Gated RCCB Stereo** | Stereo-RCCB-Gated | DGS | **6.23** | **0.04** | **2.03** | **96.69** | **98.50** | **99.26** |
| | Test Data - Day (Evaluated on LiDAR Ground-Truth Points) | | | | | | | | |
| COMPARISON TO STATE-OF-THE-ART | Gated2Depth | Mono-Gated | D | 28.68 | 0.22 | 14.76 | 66.68 | 82.76 | 87.96 |
| | Gated2Gated | Mono-Gated | MG | 16.87 | 0.21 | 9.51 | 73.93 | 92.15 | 96.10 |
| | PackNet | Mono-RGB | M | 17.69 | 0.21 | 9.77 | 72.12 | 90.65 | 96.51 |
| | Monodepth2 | Mono-RGB | M | 20.78 | 0.22 | 10.06 | 79.05 | 90.66 | 94.69 |
| | SimIPU | Mono-RGB | D | 14.33 | 0.14 | 7.50 | 81.77 | 94.01 | 97.82 |
| | AdaBins | Mono-RGB | D | 12.76 | 0.12 | 6.53 | 86.15 | 95.77 | 98.41 |
| | DPT | Mono-RGB | D | 11.29 | 0.09 | 5.52 | 89.56 | 96.83 | 98.79 |
| | DepthFormer | Mono-RGB | D | 10.59 | 0.09 | 5.06 | 90.65 | 97.46 | 99.02 |
| | PSMNet | Stereo-RGB | D | 32.13 | 0.28 | 18.09 | 53.82 | 74.91 | 84.96 |
| | STTR | Stereo-RGB | D | 16.77 | 0.16 | 8.99 | 78.44 | 93.53 | 98.01 |
| | HSMNet | Stereo-RGB | D | 10.36 | 0.08 | 4.69 | 92.47 | 97.93 | 99.11 |
| | ACVNet | Stereo-RGB | D | 9.40 | 0.07 | 4.08 | 94.61 | 98.36 | 99.12 |
| | RAFT-Stereo | Stereo-RGB | D | 9.40 | 0.07 | 4.07 | 93.76 | 98.15 | 99.09 |
| | CS-Stereo | RCCB-NIR | D | 21.51 | 0.22 | 11.87 | 73.70 | 88.77 | 96.06 |
| | UCSSM | RCCB-NIR | D | 17.32 | 0.29 | 13.26 | 64.80 | 84.78 | 93.83 |
| | CREStereo | Stereo-RCCB | D | 9.68 | 0.06 | 3.88 | 95.02 | 96.04 | 98.57 |
| | Gated Stereo | Stereo-Gated | DGS | 7.11 | 0.05 | 2.25 | 96.87 | 98.46 | 99.11 |
| | **Gated RCCB Stereo** | Stereo-RCCB-Gated | DGS | **6.89** | **0.03** | **1.95** | **97.18** | **98.55** | **99.18** |

| Method | Modality | Train | RMSE [m] | ARD | MAE [m] | $\delta_1$ [%] | $\delta_2$ [%] | $\delta_3$ [%] |
|---|---|---|---|---|---|---|---|---|
| Test Data - Night (Evaluated on LiDAR Ground-Truth Points) | | | | | | | | |
| CREStereo | Stereo-RCCB | D | 17.64 | 0.08 | 10.05 | 90.66 | 98.43 | 99.48 |
| Gated Stereo | Stereo-Gated | DGS | 14.03 | 0.11 | 8.93 | 84.21 | 98.83 | 99.46 |
| **Gated RCCB Stereo** | Stereo-RCCB-Gated | DGS | **12.02** | **0.10** | **7.94** | **86.05** | **99.71** | **99.90** |
| Test Data - Day (Evaluated on LiDAR Ground-Truth Points) | | | | | | | | |
| CREStereo | Stereo-RCCB | D | 15.65 | 0.07 | 8.11 | 93.86 | 98.57 | 99.42 |
| Gated Stereo | Stereo-Gated | DGS | 14.24 | 0.10 | 8.67 | 86.76 | 98.76 | 99.41 |
| **Gated RCCB Stereo** | Stereo-RCCB-Gated | DGS | **10.69** | **0.09** | **6.83** | **90.25** | **99.57** | **99.81** |

| | Modality | Full Res. | CS Training | Pose Ref. | Att. Fusion | MPViT Backb. | RMSE [m] | MAE [m] | $\delta_1$ [%] | $\delta_2$ [%] | $\delta_3$ [%] |
|---|---|---|---|---|---|---|---|---|---|---|---|
| | Test Data - Night (Evaluated on LiDAR Ground-Truth Points) | | | | | | | | | | |
| ABLATION | Stereo-RCCB-Gated | ✓ | ✓ | ✓ | ✓ | ✓ | **6.23** | **2.03** | **96.69** | **98.50** | **99.26** |
| | Stereo-RCCB-Gated | ✗ | ✓ | ✓ | ✓ | ✓ | 6.53 | 2.04 | 96.37 | 98.45 | 99.24 |
| | Stereo-RCCB-Gated | ✗ | ✗ | ✓ | ✓ | ✓ | 6.87 | 2.18 | 96.20 | 98.24 | 99.13 |
| | Stereo-RCCB-Gated | ✗ | ✗ | ✗ | ✓ | ✓ | 6.98 | 2.23 | 96.01 | 98.21 | 99.11 |
| | Stereo-RCCB-Gated | ✗ | ✗ | ✗ | ✗ | ✓ | 7.23 | 2.42 | 95.89 | 98.20 | 99.10 |
| | Stereo-RCCB-Gated | ✗ | ✗ | ✗ | ✗ | ✗ | 8.17 | 2.74 | 95.23 | 97.79 | 98.89 |
| | RCCB-Gated | ✗ | ✗ | ✗ | ✗ | ✗ | 10.56 | 7.89 | 45.23 | 79.49 | 91.14 |
| | Mono-Gated | ✗ | ✗ | ✗ | ✗ | ✗ | 10.87 | 4.70 | 89.91 | 95.77 | 97.90 |
| | Test Data - Day (Evaluated on LiDAR Ground-Truth Points) | | | | | | | | | | |
| ABLATION | Stereo-RCCB-Gated | ✓ | ✓ | ✓ | ✓ | ✓ | **6.89** | 1.95 | **97.18** | **98.55** | **99.18** |
| | Stereo-RCCB-Gated | ✗ | ✓ | ✓ | ✓ | ✓ | 7.09 | **1.93** | 97.03 | 98.46 | 99.11 |
| | Stereo-RCCB-Gated | ✗ | ✗ | ✓ | ✓ | ✓ | 7.57 | 2.12 | 96.62 | 98.35 | 99.04 |
| | Stereo-RCCB-Gated | ✗ | ✗ | ✗ | ✓ | ✓ | 7.64 | 2.16 | 96.37 | 98.52 | 99.06 |
| | Stereo-RCCB-Gated | ✗ | ✗ | ✗ | ✗ | ✓ | 7.92 | 2.29 | 96.50 | 98.25 | 98.00 |
| | Stereo-RCCB-Gated | ✗ | ✗ | ✗ | ✗ | ✗ | 8.17 | 2.44 | 96.46 | 98.12 | 98.92 |
| | RCCB-Gated | ✗ | ✗ | ✗ | ✗ | ✗ | 8.61 | 4.73 | 67.33 | 89.75 | 96.30 |
| | Mono-Gated | ✗ | ✗ | ✗ | ✗ | ✗ | 13.71 | 6.05 | 88.99 | 95.56 | 97.71 |

FIG. 13

METHOD AND SYSTEM FOR DEPTH ESTIMATION USING CROSS-SPECTRAL GATED-RGB STEREO

TECHNICAL FIELD

The field of the disclosure relates generally to autonomous vehicles and, more specifically, to systems and methods for depth estimation using cross-spectral gated-RGB stereo.

BACKGROUND

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Large-scale outdoor scene reconstruction including depth estimation is essential for advancing autonomous robotics, drones, and driver-assistance systems, serving as the foundation for scene understanding, safe navigation, dataset generation and validation. Gated cameras are used in perception technologies for scene reconstruction and depth estimation. The gated cameras flood-illuminate a scene and capture the time-gated impulse response of a scene. By employing nanosecond-scale gates, sensors can capture mega-pixel gated images, delivering dense depth improving on today's LiDAR sensors in spatial resolution and depth precision. Although gated depth estimation methods can deliver, for example, one million depth estimates per frame, their resolution is still an order below existing RGB imaging methods. In other words, at ranges greater than 100 m, the spatial resolution of existing sensors, with a few points per pedestrian, is not sufficient for semantic understanding. Additionally, both frequency-modulated as well as time-of-flight (ToF) LiDAR systems have proven to be unreliable in the presence of backscatter and fall short in comparison to vertical resolution offered by modern high dynamic range (HDR) megapixel cameras.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a system for depth estimation is provided. The system includes a gated camera stereo system, a red-clear-clear-blue (RCCB) camera, at least one memory storing instructions, and at least one processor communicatively coupled with the at least one memory is provided. The at least one processor is configured to execute the stored instructions to: (i) control the gated camera stereo system to emit a pulse of light at a predetermined wavelength; (ii) control a detector of the gated camera stereo system to capture light reflected from a scene after a preset time delay; (iii) based upon the captured light by the detector of the gated camera stereo system, embed depth data into two-dimensional (2D) gated images using a gate function; (iv) control the RCCB camera to capture passive high dynamic range (HDR) images; (v) extract features corresponding to the gated images and the passive HDR images; and (vi) fuse the extracted features corresponding to the gated images and the passive HDR images by cross-spectral matching for depth estimation.

In another aspect, a vehicle including a gated camera stereo system, a red-clear-clear-blue (RCCB) camera, at least one memory storing instructions, and at least one processor communicatively coupled with the at least one memory is provided. The at least one processor is configured to execute the stored instructions to: (i) control the gated camera stereo system to emit a pulse of light at a predetermined wavelength; (ii) control a detector of the gated camera stereo system to capture light reflected from a scene after a preset time delay; (iii) based upon the captured light by the detector of the gated camera stereo system, embed depth data into two-dimensional (2D) gated images using a gate function; (iv) control the RCCB camera to capture passive high dynamic range (HDR) images; (v) extract features corresponding to the gated images and the passive HDR images; and (vi) fuse the extracted features corresponding to the gated images and the passive HDR images by cross-spectral matching for depth estimation.

In yet another aspect, a computer-implemented method for depth estimation is provided. The computer-implemented method includes (i) controlling a gated camera stereo system to emit a pulse of light at a predetermined wavelength; (ii) controlling a detector of the gated camera stereo system to capture light reflected from a scene after a preset time delay; (iii) based upon the captured light by the detector of the gated camera stereo system, embedding depth data into two-dimensional (2D) gated images using a gate function; (iv) controlling a red-clear-clear-blue (RCCB) camera to capture passive high dynamic range (HDR) images; (v) extracting features corresponding to the gated images and the passive HDR images; and (vi) fusing the extracted features corresponding to the gated images and the passive HDR images by cross-spectral matching for depth estimation.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 9 is an example table showing evaluation of the disclosed depth estimation method using cross-spectral gated-RGB stereo compared to other approaches;

FIG. 10 is an example table showing evaluation on accumulated LiDAR scans under different lighting conditions for the disclosed depth estimation method using cross-spectral gated-RGB stereo compared to other approaches;

FIG. 13 is an example table showing results of ablation experiments for different modalities on a dataset.

Figure 1:
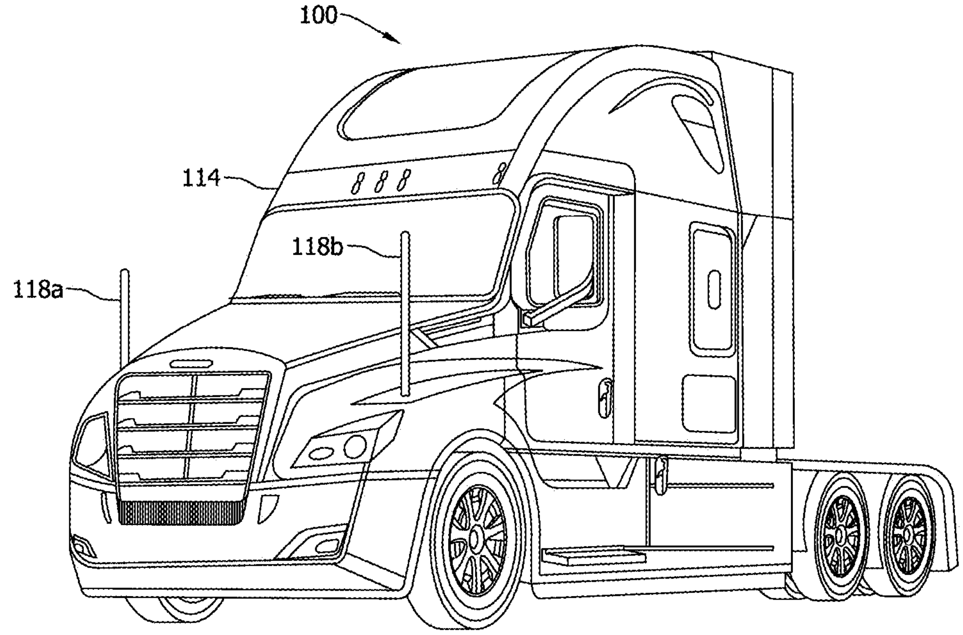
FIG. 1 is a schematic view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Various embodiments described herein correspond with systems and methods for depth estimation based upon combined high-resolution stereo HDR RCCB cameras with gated imaging, which enables exploiting depth cues from active gating, multi-view RGB and multi-view near-infrared (NIR) sensing-multi-view and gated cues across the entire spectrum. The resulting capture system utilizes low-cost complementary metal-oxide semiconductor (CMOS) sensors and flood-illumination. A stereo-depth estimation method disclosed herein is capable of exploiting these multi-modal multi-view depth cues, including active illumination that is measured by the RCCB camera when removing the IR-cut filter, and achieving an accurate depth at long ranges up to 220 meters, outperforming the next best known depth estimation method, for example, by 16% in mean absolute error (MAE) on accumulated light detection and ranging (LiDAR) ground truth.

As described herein, depth estimation has become a cornerstone sensing modality for three dimensional (3D) scene understanding in a wide range of applications such as perception and planning in autonomous driving and robotics. Today's fully autonomous robots mainly rely on scanning LiDAR for depth estimation. However, at ranges greater than 100 m, the spatial resolution of existing sensors, with a few points per pedestrian, is not sufficient for semantic understanding. Furthermore, both frequency-modulated as well as ToF LiDAR systems have proven to be unreliable in the presence of backscatter. While innovations in LiDAR technology such as microelectromechanical system (MEMS) scanning mechanisms and advanced photodiode systems have substantially lowered costs and enabled the development of sensors with approximately 100 to 200 scanlines, which still fall short in comparison to the vertical resolution offered by modern HDR megapixel cameras, which can exceed 10 k pixels.

Wide-baseline red-green-blue (RGB) stereo depth estimation methods overcome this issue of poor resolution by providing depth maps at image resolution, but still can fail in low-light scenes and texture-less regions. Disclosed gated imaging methods can be used as a potential alternative sensor modality for 3D detection and depth estimation, offering the capability to overcome low LiDAR-resolution, while providing comparable accuracy. When operating in the NIR spectrum, gated imaging systems combine CMOS sensors with active flash illumination and analogue gated readout as a robust approach to low-light and adverse weather conditions. For depth prediction, the disclosed Gated2Depth method employs three gated slices in a neural network trained via a combination of simulation and LiDAR supervision. Additionally, a self-supervised training approach is used to generate higher-quality depth maps. Similarly, the disclosed gated stereo method employs a wide-baseline stereo-gated configuration for depth estimation, and outperforms scanning LiDAR systems in depth resolution, precision, and robustness to backscatter in fog, rain, and snow. Even though these methods successfully outperform LiDAR in depth sensing, they are constrained by the gated imager's megapixel resolution and lack of color information, which results in noticeable diminished details at long distances. While RGB-only depth methods yield high-resolution depth maps, but these methods are not metric and lack the precision of LiDAR-based depth measurements.

In some embodiments, the drawbacks associated with the known depth estimation methods are solved using a low-cost CMOS-only sensing method that combines multi-view RGB sensing with gated cameras, exploiting active and multi-view cues across the visible and NIR spectrum. Specifically, a NIR gated camera in conjunction with a HDR RCCB camera without an IR-cut filter present is proposed herein for RCCB cameras incorporating clear channel filter where conventional RGGB Bayer color filter features the green channel, which enhances their sensitivity in low-light conditions. The disclosed joint approach allows use of the spectral overlap for estimating high-resolution depth maps at RCCB-camera resolution of 8 megapixels, an order of magnitude higher than the gated imager resolution.

The capabilities of cross-spectral imaging are due to the complementary information coming from different sensor modalities. For depth estimation, however, combining images from different spectra are difficult due to the differing appearance of the images. Accordingly, in some embodiments, two multi-view stereo views across the spectrum and an active illuminator (visible by both) are combined by fusing the features of both modalities of the respective viewpoints. Specifically, to recover depth, a stereo depth estimation method is disclosed, which incorporates a novel cross-spectral fusion module leveraging intermediate depth outputs for accurate registration of feature maps from both modalities, a pose refinement step and attention-based feature fusion. The merged features encompass complementary data from both spectra, enabling their use in the stereo network to generate accurate depth maps in any lighting conditions.

The stereo depth estimation method disclosed herein produces more accurate results for automotive driving in urban, suburban and highway environments in varying lighting conditions, and is found to be superior to currently known active and hybrid methods. The high-resolution depth estimation using the method disclosed herein enables new applications, such as detecting small lost cargo objects in highway scenarios that cannot be resolved by conventional methods.

In summary, various embodiments disclosed herein include a cross-spectral depth estimation method that recovers high-resolution dense depth maps from multi-view and ToF depth cues across the visible and NIR spectrum using a cross-modal stereo network. The cross-modal stereo network jointly estimates the depth from passive and active RCCB and gated features and a semi-supervised training scheme to train the depth estimator. The disclosed cross-spectral depth estimation methods, using the cross-modal stereo network, produce accurate depth maps on accumulated LiDAR point-clouds up to 220 m, which outperforms existing method, for example, by 16% in MAE.

In some embodiments, the above-listed issues or drawbacks of the known systems and methods are resolved using cross-spectral depth estimation methods, as described in more detail in the present disclosure, using FIGS. 1-14 below.

FIG. 1 illustrates a vehicle 100, such as a truck that may be conventionally connected to a single or tandem trailer to transport the trailer (not shown) to a desired location. The vehicle 100 includes a cabin 114 that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin 114.

The vehicle 100 may be an autonomous vehicle, in which case the vehicle 100 may omit the steering wheel and the steering column to steer the vehicle 100. Rather, the vehicle 100 may be operated by an autonomy computing system (not shown) of the vehicle 100 based on data collected by a sensor network (not shown in FIG. 1) including one or more sensors.

Figure 2:
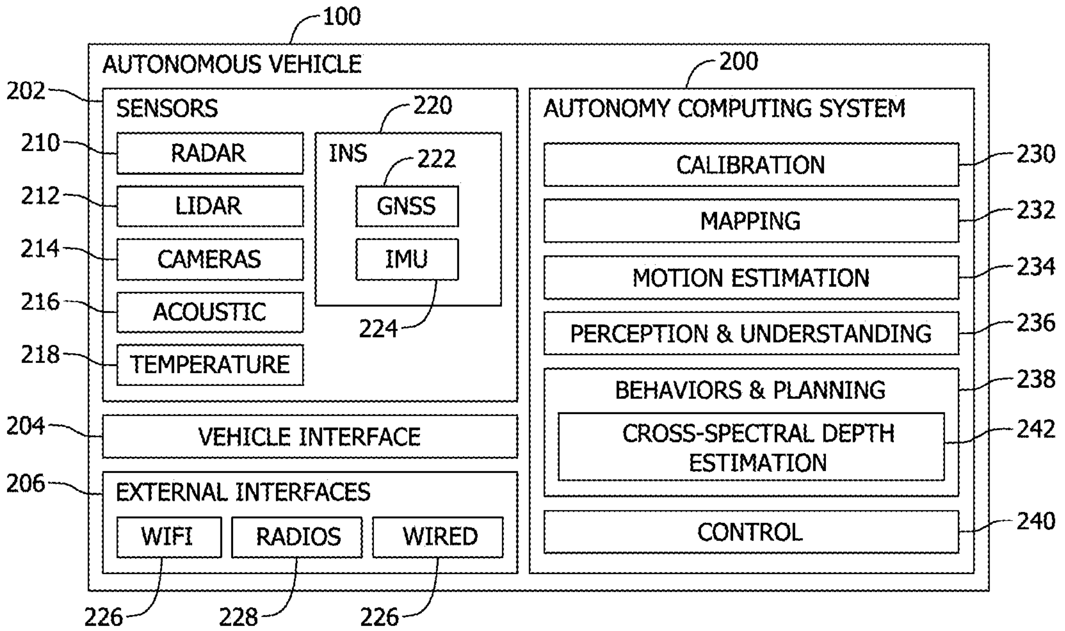
FIG. 2 is a block diagram of the autonomous truck shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed for 3D objects detection in the environment surrounding autonomous vehicle 100. In some embodiments, the image data generated by cameras 214 may be sent to autonomy computing system 200 or other aspects of autonomous vehicle 100 or a hub or both.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination in perception technologies of autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5G, 6G, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a cross-spectral depth estimation module 242. The cross-spectral depth estimation module 242, for example, may be embodied within another module, such as behaviors and planning module 238, or perception and understanding module 236, or separately. These modules may be implemented in dedicated hardware such as, for example, an application specific integrated circuit (ASIC), field programmable gate array (FPGA), a digital signal processor (DSP), or microprocessor, or implemented as executable software modules, or firmware, written to memory and executed on one or more processors onboard autonomous vehicle 100. The cross-spectral depth estimation module 242 may perform one or more tasks including, but not limited to, recovering high-resolution dense depth maps from multi-view and ToF depth cues across the visible and NIR spectrum irrespective of ambient illumination or lighting conditions.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
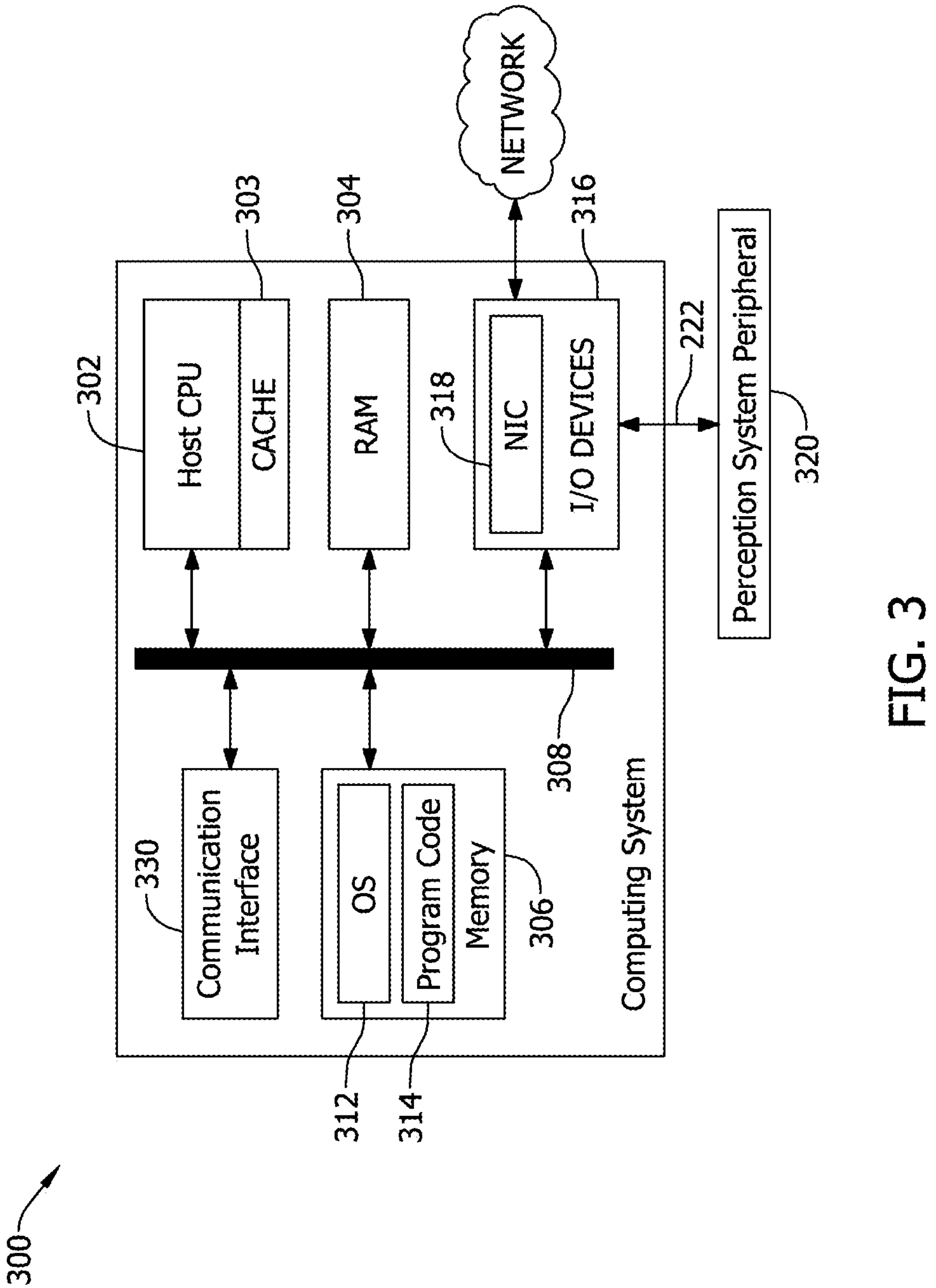
FIG. 3 is a block diagram of an example computing system.

FIG. 3 is a block diagram of an example computing system 300, such as an application server at a hub. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 2. In alternative embodiments, one or more section of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface such as a network interface controller (NIC) 318, or a peripheral interface for communicating with a peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, one or more weight sensors, a keyboard, or a display device, etc.

Depth Estimation from Monocular and Stereo Intensity Images

Depth estimation from intensity images is performed using various modalities that include using single-image captures to stereo im-ages and cross modal representations using intensity images augmented with sparse LiDAR data. Further refinement techniques generally enhance the predicted depth maps and increase resolution. Various loss formations, neural architectures and introduced consistencies, large unlabeled datasets, self-supervised approaches exploiting stereo and temporal consistencies are identified using currently known methods; however, these methods do not resolve the need for dense depth ground truth for high-quality depth estimation as these methods rely on sparse LiDAR measurements as ground truth. However, using LiDAR measurements as direct inputs for both supervised training and inference can result propagating temporal LiDAR distortions and scan pattern artifacts.

Depth from ToF

Unlike depth estimation from intensity images, ToF sensors determine depth by measuring the time, it takes for emitted light to return to the detector. Acquisition approaches can be classified into correlation ToF cameras, pulsed ToF sensors, and gated illumination with wide depth measurement bins. Correlation ToF cameras use flood-illumination to gauge depth from the phase difference be-tween emitted and received light pulses, offering high spatial depth resolution. However, these sensing modalities struggle in outdoor environments due to sensitivity to ambient light. Pulsed ToF sensors measure the round-trip time of a single light pulse to a scene point, yielding high-depth accuracy, however, pulsed ToF sensors rely on scanning that compromises spatial resolution. Moreover, these ToF sensors degrade in fog or snow because of backscatter. Gated cameras combine high resolution CMOS imagers with microsecond exposure times, integrating pulsed flood-illumination with adjustable delays. Through this temporal gating, backscatter is effectively eliminated, and coarse depth is reconstructed. Extracting more refined depth generally use analytical methods, such as Bayesian methods and deep neural networks, excel in low-light and outdoor scenarios. Further, a depth is predicted using a reconstruction network rivaling conventional stereo models along with a refined self-supervised method. Additionally, two gated imagers are combined for optimizing depth estimation through multi-view cues. However, all of these methods are designed for gated imagers only, which compromise resolution compared to RGB imagers and in scenarios when the NIR laser power is low compared to ambient light. In the embodiments described herein, these limitations are eliminated by combining NIR gated cameras with high-resolution visible-spectrum RCCB sensors.

Cross-Spectral Matching

Conventional stereo matching algorithms assume match based on the brightness constancy assumption. Multiple sensors, operating in distinct spectral ranges, are used as an additional source of information in areas such as Face Recognition, self-driving cars, visual surveillance, and smartphones. Currently known methods for matching features are visually distinct but remain semantically congruent. Gradients are used as a robust feature for cross-modal matching, with focus on the alignment of monochrome images to have increased light sensitivity, with RGB images to achieve precise depth in dim lighting scenarios. Some methods aim to learn cross-modal matching, with some other methods aiming to morph one modality directly into another and using descriptors for modality matching.

Multi-View Gated and RCCB Imaging

In some embodiments, an image of a scene is captured using a gated camera stereo system and an RCCB stereo array characterized both by a baseline of b=0.76 m. The gated imager is an active sensor and emits a pulse of light with a confined wavelength around or up to 808 nanometers (nm), whereas the RCCB camera is a passive sensor with a sensitivity spectrum spanning the visible band from about 380-1050 nm. While conventional RGB cameras use color filter arrays with an RGGB pattern that is also referenced herein as a Bayer pattern, in RCCB cameras the green channels are replaced with clear channels. The inclusion of clear channels in this pattern (e.g., the Bayer pattern) allows an enhanced light sensitivity, boosting its performance≈30% during night-time conditions. In addition, an image sensor, such as Onsemi AR0820AT, is optimized for both low light and challenging HDR scene performance, with a 2.1 μm dynamic response (DR) pixel (Pix) backside illuminated (BSI) pixel and on-sensor 140 dB HDR capture capability.

In the stereo gated camera system, a laser pulse p is emitted at t=0. Following a set time delay ξ, the reflected scene is then integrated on both camera sensors. Only photons within a specific temporal gate are captured, using the gate function g, embedding depth data into two dimensional (2D) imagery. The intensities, or range-intensity-profile $C_k(z)$, are scene-independent and can be expressed as $$I_k(z,t)=\alpha\ C_k(z,t)=\alpha\int_{-\infty}^{\infty}g_k(t-\xi)p_{k\left(t-\frac{2z}{c}\right)}\beta(z)\,dt. \quad \text{Eq. 1}$$

In Eq. 1 above, $I_k(z, t)$ is the gated exposure at distance z and time t; α represents surface reflectance while β accounts for atmospheric attenuation. Both image sets are adjusted and calibrated for aligned epipolar lines, enabling disparity d estimation. This disparity corresponds to distance $$z=\frac{bf}{d}$$

offering depth insights across all slices. Ambient light sources, such as sunlight or vehicle headlights influence the gated system's operation. These unmodulated photons contribute a constant term, Λ. Separately, irrespective of ambient lighting, there is a dark current, $$D_v^k,$$

which is dependent on gate setting. Accordingly, an image may be modelled as:

$$I_v^k(z)=\alpha\ C_k(z)+\Lambda+D_v^k, \quad \text{Eq. 2}$$

In some embodiments, additional passive HDR images with fixed exposure times of 21 µs and 108 µs are captured during the day and extending the exposure times to 805 µs and 1745 µs at night. In some embodiments, when integrating both gated and RCCB stereo systems, each camera is represented by its calibration matrix K. The relative orientation and position between cameras in a stereo pair are captured by the rotation matrix, $R\in SO(3)$, and a translation vector, $t\in\mathbb{R}^{3\times1}$.

Depth from RCCB and Gated Stereo

In some embodiments, a cross-modal fusion technique for depth prediction is disclosed. The disclosed cross-modal fusion technique relies on multi-view cues from RCCB stereo and gated stereo images. By registering and fusing cross-spectral features through an attention mechanism and prior pose refinement within the stereo network, complementary information from different camera modalities is capitalized as discussed below. Further, integration of the feature fusion in a stereo network as a jointly trained unimodal and multi-modal, facilitating a holistic feature representation across modalities and minimizing domain differences between modalities is described in detail below along with the training approach.

Cross-Spectral Matching

In some embodiments, cross-modal features are aligned and combined in a two-stage approach, where features are first warped into a shared space based on a refined pose. Using the aligned features, an attention-based fusion is performed as an input to the remainder of the stereo estimation network. An overview of cross-spectral matching (CSM) is illustrated in FIG. 5.

Figure 4:
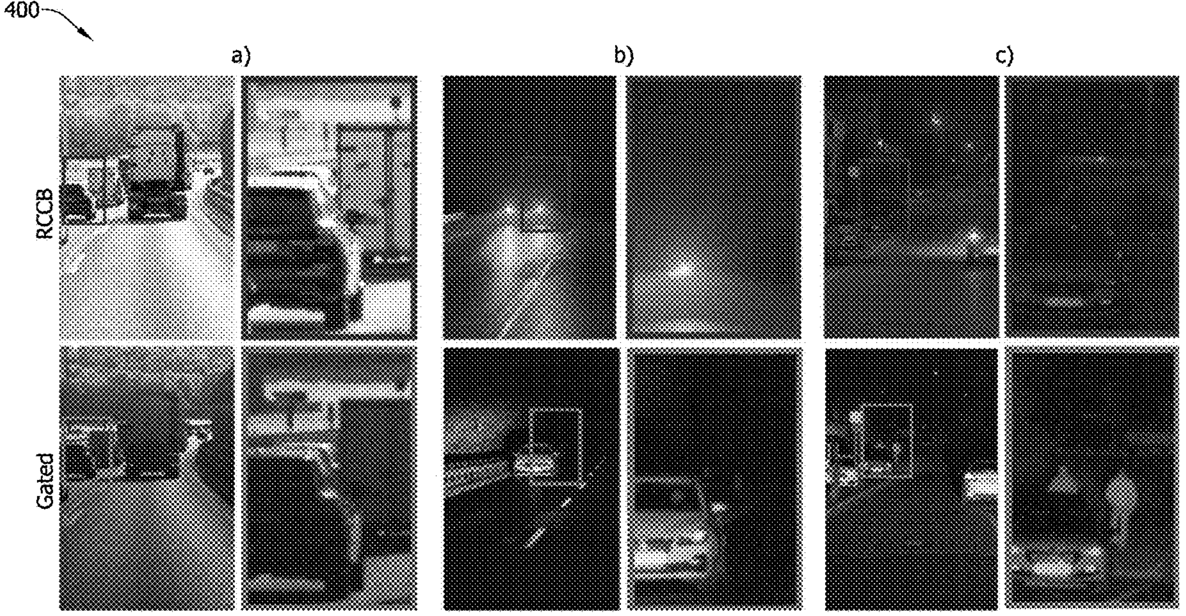
FIG. 4 is an illustration of an example images taken using red-clear-clear-blue (RCCB) and gated cameras.

FIG. 4 is an illustration of an example view 400 of images taken using red-clear-clear-blue (RCCB) and gated cameras. In FIG. 4, in the top row, 8 mega pixel (Mpix) passive RGB images captured using RCCB cameras are shown, and in the bottom row, ToF data of a scene recorded by combining active flash illumination and analog gated readout using gated cameras is shown. Both RCRB and gated camera sensors are complementary, with distinct strengths depending on the scenario. RCCB cameras excel in daylight (a) with high dynamic range, resolution, and color. At night (b, c), gated images (gated slices here RGB-color coded) provide strong depth cues and maintain consistent scene illumination through active illumination. In other words, both modalities may be integrated to estimate depth accurately in all ambient illumination conditions.

Figure 5:
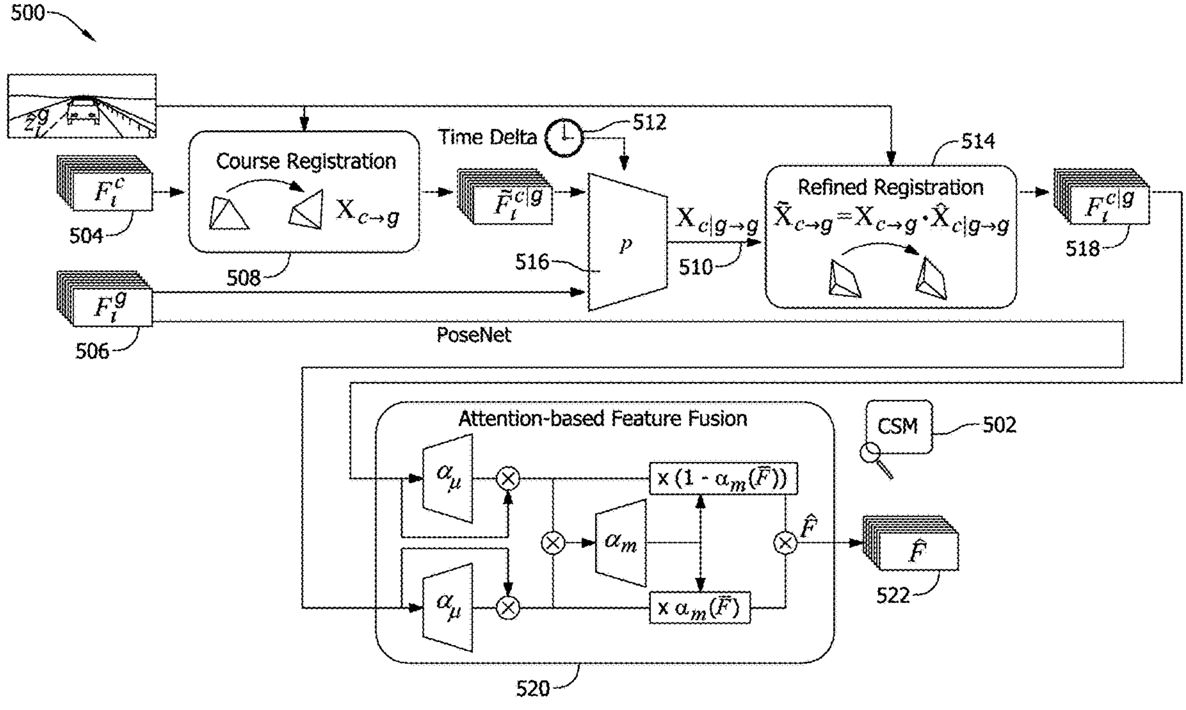
FIG. 5 is an illustration of an example block diagram of a stereo estimation network performing cross-spectral matching.

FIG. 5 is an illustration of an example block diagram 500 of a stereo estimation network performing cross-spectral matching. As shown in FIG. 5, a layer 502 fuses encoded features from RCCB $$(F_l^C)$$

504 and gated $$(F_l^g)$$

506 images. In the coarse registration step 508, RCCB features are aligned with gated features based on calibrated poses $x_{C\to g}$. Registration is refined 514 based on residual pose x̂c|g→g 510 estimated from coarse aligned images from 508 and measured time delta 512 with PoseNet 516. Registered images 518 are fused with attention-based fusion 520 retaining complementary information in $\hat{F}$ 522.

Feature Extraction and Alignment

In some embodiments, two feature extractor backbones for color $$F_b^C \text{ and } F_b^g$$

are utilized and share the weights for each view $$I_l^m, I_r^m$$

where $m\in\{c, g\}$, that is:

$$F_b^C: I_l^c, I_r^c \to F_l^c, F_r^c, \quad \text{Eq. 3}$$

$$F_b^g: I_l^g, I_r^g \to F_l^g, F_r^g, \quad \text{Eq. 4}$$

In some embodiments, as a feature extractor, multi-path vision transformer for dense prediction (MPViT), which is a powerful vision transformer for dense prediction tasks, is used. To align the features, the pose information from camera calibration $x_{x\to g}$ and the intermediate depth estimation $$\hat{z}_l^g$$

to warp corresponding views. The mapping for homogeneous coordinates $x_g$ and $x_c$ from $$I_l^g \text{ and } I_l^c$$

is defined as:

$$x_g \sim k_c x_{c\to g} \hat{z}_l^g k_g^{-1} x_c, \quad \text{Eq. 5}$$

In Eq. 5 above, $k_c$ and $k_g$ are camera matrices of the RCCB and gated cameras, respectively, and $$x_{c\to g}=\begin{pmatrix} R_{C\to g} & t_{C\to g} \\ 0 & 1 \end{pmatrix}$$

with $R_{c\to g}\in SO(3)$, and $t_{c\to g}\in\mathbb{R}^{3\times1}$. Further, the features of the left RCCB camera, denoted by $$F_l^c,$$

are transformed to match with the features of the left gated camera, denoted by $$F_l^g,$$

to create of form $$\tilde{F}_l^{c|g}.$$

Pose Refinement

In some embodiments, the RCCB and gated stereo cameras are synchronized to microsecond precision. However, the RCCB camera may accumulate a slight offset of up to 20 milliseconds (ms) between images because of automatic exposure and shutter timing. To address this misalignment, a lightweight Convolutional Neural Network (CNN) framework referenced herein as a PoseNet p may be utilized. The PoseNet p estimates the rotational and translational adjustments necessary for alignment, based on pre-aligned feature maps. The input to the PoseNet p is the concatenated context $$F_l^g,$$

the transformed $$\tilde{F}_l^{c|g}.$$

and the measured time offset t between modalities. The time is integrated into every down-sampled layer of the PoseNet framework as an additional channel, except for the final layer. This channel uniformly replicates the value of time-offset across the spatial dimension. The computed pose update denoted as $\hat{X}_{c|g\rightarrow g}$ combines the initial pose as $\tilde{X}_{c|g\rightarrow g}=X_{c\rightarrow g}\cdot\hat{X}_{c|g\rightarrow g}$. Subsequently, a second warping operation with the mapping as respresented in Eq. 6 below may be applied to generate the aligned features $$\tilde{F}_l^{c|g}. \quad \text{Eq. 6}$$

$$x_g \sim K_c X_{c\rightarrow g} \tilde{z}_l^g K_g^{-1} x_c,$$

Attention-Based Feature Fusion

In some embodiments, following the alignment, RCCB and gated features are fused to combine contextual information from both spectra effectively using a two-step process. Firstly, channel self-attention is employed for aggregating both global and local contexts within feature maps. Secondly, the individual feature maps are combined utilizing the predicted attention weights. The first setup is defined as below:

$$\bar{F} = \frac{F_u^g \oplus F_u^c}{a_u(F_l^g) + a_u(F_l^c)}, \quad \text{Eq. 7}$$

$$F_u^g = F_l^g \otimes a_u(F_l^g), \quad \text{Eq. 8}$$

$$F_u^c = F_l^{c|g} \otimes a_u\left(F_l^{c|g}\right), \quad \text{Eq. 9}$$

In Eq. 7 above ⊕ denotes element-wise addition, and ⊗ denotes element-wise multiplication. The attention $a_u(\ )$ in above Eqs. 7-9 is calculated for final fusion of features $\hat{F}$ as a result of the following weighting-operation in Eq. 10.

$$\hat{F} = \left(F_u^g \otimes a_m(\bar{F})\right) \oplus \left(F_u^c \otimes \left(1 - a_m(\bar{F})\right)\right), \quad \text{Eq. 10}$$

In Eq. 10 above, $a_m$ denoted the multi-modal attention network, facilitating the effective combination of features from both modalities.

Stereo Matching

Figure 6:
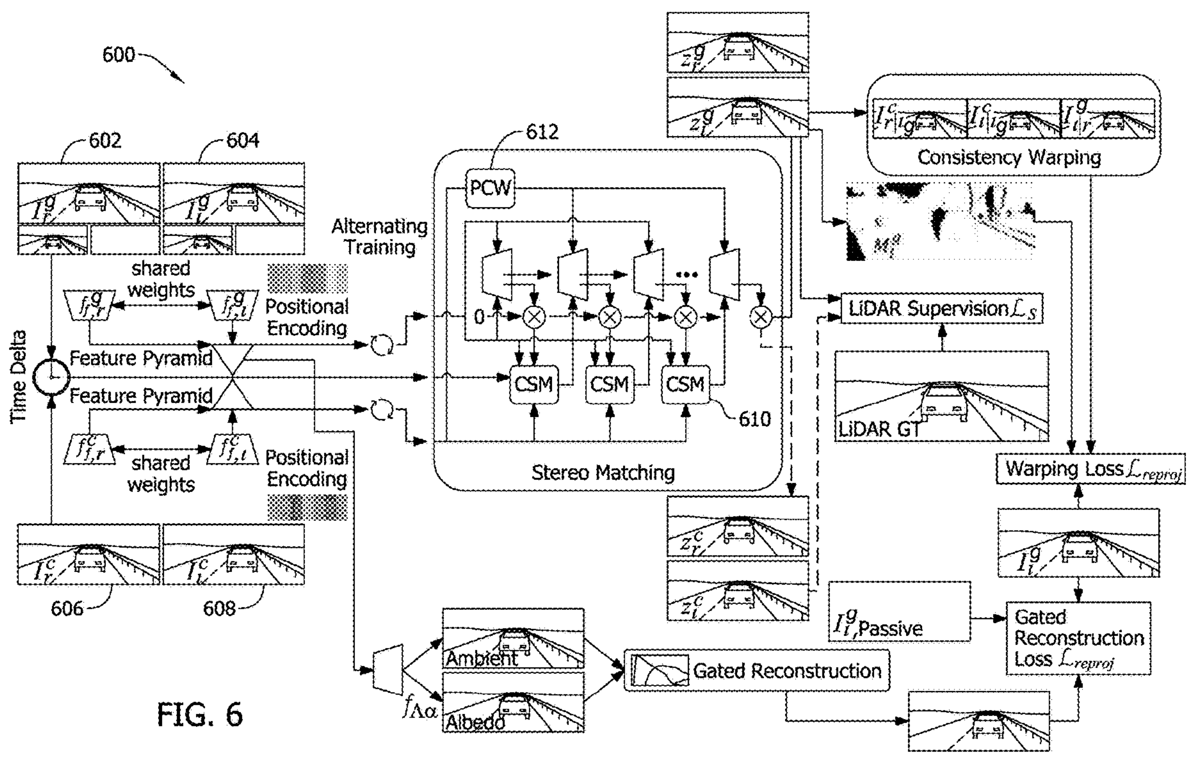
FIG. 6 is an illustration of an example cross-spectral stereo architecture for depth estimating from stereo RCCB and stereo gated images.

In some embodiments, the aligned feature $\hat{F}$ are used to predict depth across all camera views through a stereo matching network, as depicted in FIG. 6. FIG. 6 is an illustration of an example cross-spectral stereo architecture 600 for estimating depth from stereo RCCB and stereo gated images. The cross-spectral stereo architecture 600 incorporates a complementary similarity measure (CSM) layer 610 and outputs depth for all four input images 602, 604, 606, and 608 shown in FIG. 6. Intermediate depth estimates are used for iterative fusion within the CSM layer 610 along the depth estimation process. The network is trained with self-supervision (Left-Right consistency for RCCB and gated images, Gated Reconstruction) and LiDAR supervision.

The stereo matching network shown in FIG. 6 is built on top of the cascaded recurrent stereo (CREStereo) matching network architecture with major modification to allow the development of a dynamic framework switching between modalities. This dynamic interchangeability allows to adapt and optimize the disparity prediction in either modality coordinate system. Such flexibility not only enhances domain generalization but also opens avenues for the application of various consistency losses, thereby improving the accuracy of depth predictions.

The CSM layers 610 are used to bridge the coordinate system. Context feature maps are predicted and used to guide the prediction in the targeted frames. Additionally, the predicted context feature maps are iteratively refined, and the correlation volume may be calculated. The correlation is predicted in the adaptive group correlation layers unimodal and alternate in modality through the iterative refinement. The secondary modality is projected into the target frame with the refine transformation $\hat{X}_{c\rightarrow g}$ in the pre-correlation warping product-of-connection-weights (PCW) 612, where the correlation may be calculated or computed as $$\mathrm{Corr}(x, y, k) = \frac{1}{c} \sum_{i=1}^{c} F_l^v(i, x, y) F_r^v(i, x', y'), \quad \text{Eq. 11}$$

In Eq. 11 above, $F^v$ is the respective feature map transformed into the modality $v \in \{c, g, c|g, g|c\}$ with camera view l, r. Further, x' and y' are predicted as x'=x+f(k), and y'=y+g(k), with fixed offsets f(k) and g(k) for the k-th correlation pair, all channels C are summed up, and 2D-1D alternate local search strategy is applied for computation efficiency. By way of a non-limiting example, the initial iteration at the coarsest scale focuses on predicting depth solely from the target modality.

Training Supervision

In some embodiments, the network is trained to output the disparity d, which is converted into the depth z for all modalities g, c and views l, r. Additionally, the stereo matching unimodal and multi-modal are trained with and without cross-spectral feature enhancement to ensure optimal extracted features while sharing the stereo matching stage. In some embodiments, the CSM and PCW layers are deactivated to ensure that the backbone learns relevant features for all modalities and the mix and matching between modalities forces all features to be domain independent, thereby creating robust cross-modal representations. Further, self-supervised and supervised loss functions for both the gated camera and the RCCB camera, as well as consistencies in between, may be implemented.

All self-supervised consistency losses and supervised losses are described herein without diminishing generality, with the losses defined for disparity prediction in the gated frame for better readability.

Left-Right Reprojection Consistency

The projection loss enforces the photometric consistency between the left and right camera views within each modality. Further, cross-modally the homogeneity between predicted depth maps is enforced. The total loss for the left gated camera gi can be represented as Eq. 12 below.

$$\mathcal{L}_w^{gl} = \mathcal{L}_p\left(I_l^g, I_{r|lg}^g\right) + \mathcal{L}_p\left(I_{l|lg}^c, I_{r|lg}^c\right) + \mathcal{L}_p\left(z_l^{c|g}, z_l^g\right), \quad \text{Eq. 12}$$

In Eq. 12 above, with $$I_{r|lg}^g$$

the r right g gated image warped into the l left gated view using the predicted depth $$z_l^g$$

denoted as warping operation lg for the stereo pairs. For the gated warping consistency further, the RCCB frames $I^C$ are warped according to the predicted depth in c is transformed to the gated frame g leading to $$z_l^{c|g}.$$

By way of a non-limited example, consistencies are also applicable to the right gated frame, yielding $$\mathcal{L}_w^{gr},$$

and to both left $$\mathcal{L}_w^{cl}$$

and right $$\mathcal{L}_w^{cr}$$

RCCB frames. The totla loss therefore can be represented as $$\mathcal{L}_{reproj} = \mathcal{L}_w^{cl} + \mathcal{L}_w^{cr} + \mathcal{L}_w^{gl} + \mathcal{L}_w^{gr}.$$

Further, $\mathcal{L}_p$ is a similarity loss based on the structural similarity (SSIM) metric and the $L_l$ norm, $$\mathcal{L}_p(a, b) = 0.85\,\frac{1 - SSIM(a, b)}{2} + 0.15\|a - b\|_1.$$

Gated Reconstruction Loss

In some embodiments, to supervise the embedded ToF information in the gated slices, the cyclic gated reconstruction loss is adopted. The cyclic gated reconstruction loss uses measured range intensity profile to reconstruct the input gated images from the predicted depth z, the albedo $\tilde{\alpha}$, and the ambient $\tilde{\Lambda}$. Additionally, instead of measured profiles, an analytical gating model may be employed to estimate the albedo $\tilde{\alpha}$ and the ambient $\tilde{\Lambda}$ through an additional context encoder taking the feature pyramid as input, for example, as shown in FIG. 6. A gated slice may be modeled as $\tilde{I}^k(z) = \tilde{\alpha} C_k(z) + \tilde{\Lambda}$. The loss term incorporates both per-pixel difference and structural similarity, following Eq. 13 below in which $M_g$ represents per-pixel signal-to-noise-ratio (SNR) consistency mask.

$$\mathcal{L}_{recon} = \mathcal{L}_p\left(M_g \odot \tilde{I}^k(z), M_g \odot I^k\right) + \mathcal{L}_p\left(\tilde{\Lambda}, \Lambda^{k_0}\right), \quad \text{Eq. 13}$$

LiDAR Supervision

In some embodiments, final and intermediated disparity predictions are supervised, and each disparity prediction $\{d_{l,i}, \ldots, d_{l,n}\}$ is upsampled to fill resolution and compared to ground truth with a weighted combination of $l_1$ and $l_2$ defined as, $$\mathcal{L}_{lidar} = \sum_{i=1}^{n} \gamma^{n-i}\left(\frac{2}{3}\|d_{gt} - M \odot d_l\|_1 + \frac{1}{3}\|d_{gt} - M \odot d_l\|_2, \quad \text{Eq. 14}$$

In Eq. 14 above, $\gamma$ represents the weight and its value is set to, for example, 0.9, and the mask M excludes areas without ground truth. For ground truth, accumulated and sparse LiDAR measurements are used. Additionally, loss term may be obtained by combining all supervised and self-supervised loss components computed above as shown in Eq. 15. Additionally, or alternatively, hyperparameter setting for the stereo depth estimation using cross-spectral matching method as described herein may be optimized.

$$\mathcal{L}_{stereo} = C_1\mathcal{L}_{reproj} + C_2\mathcal{L}_{recon} + C_3\,\mathcal{L}_{lidar}, \quad \text{Eq. 15}$$

Dataset for Training Neural Network

Figure 7:
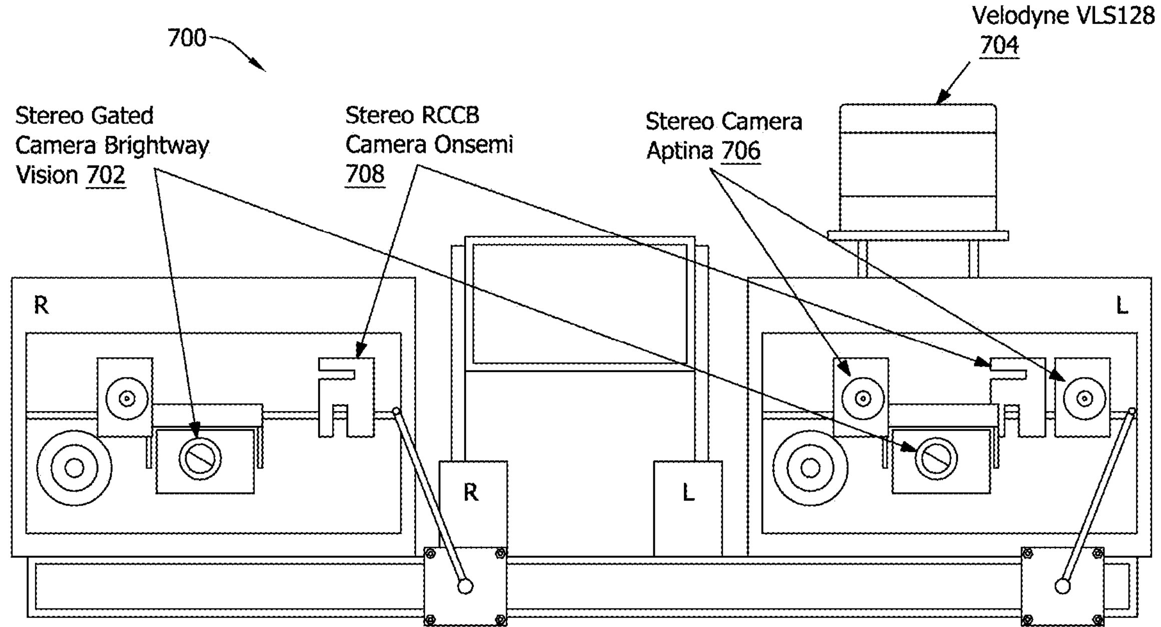
FIG. 7 is an illustration of an example sensor setup of a test vehicle (or ego vehicle)

In some embodiments, a dataset for training and testing includes stereo gated, stereo RGB and ground truth LiDAR data. Additionally, the dataset used for training and testing may be extended with data of a RCCB stereo camera, for example, an AR0820 sensor. Sensors may be housed in a portable sensor cube as shown in FIG. 7. FIG. 7 is an illustration of an example sensor system 700 of a test vehicle (or ego vehicle). The sensor system 700 of the test vehicle used for capturing the dataset. The sensor system 700 includes a stereo gated camera 702 including a floodlight flash source mounted at a front bumper of the test vehicle (not shown in FIG. 7) and two gated imagers (not shown in FIG. 7), a LiDAR sensor 704 (e.g., Velodyne VLS128 scanning LiDAR sensor), a standard stereo RGB camera 706 and the RCCB stereo camera 708. Additionally, or alternatively, an additional source of ground truth, a densely constructed LiDAR map may be utilized. The densely constructed LiDAR map may be derived from a custom adaptation of the LIO-SAM algorithm, which is a tightly coupled LiDAR inertial odometry via smoothing and mapping algorithm.

In some embodiments, an accuracy of the disclosed depth estimation method using cross-spectral matching under nighttime and daytime conditions may be verified or validated by comparing it to the known depth estimation techniques or methods. Additionally, the disclosed depth estimation method may be validated through a series of ablation studies or ablation experiments.

In some embodiments, the dataset for training, testing, and validating may include about 2463 frames, split into about 1269 daytime and about 1194 nighttime frames. Each frame is accompanied by high-resolution LiDAR ground-truth measurements, capturing reliable data up to about 160 m. By way of a non-limiting example, about 655 frames (e.g., about 303 daytime and about 352 nighttime frames) of refined LiDAR ground-truth. These frames feature accumulated point clouds, allowing assess the methods on a dense ground truth for accuracy up to about a distance of 220 m.

In some embodiments, evaluation metrics used for validating the disclosed depth estimation method using cross-spectral matching method may include Root Mean Square Error (RMSE), Mean Absolute Error (MAE), Absolute Relative Difference (ARD), and the threshold accuracy metric may be $\delta_i<1.25^i$ for $i\in 1, 2, 3$. Currently known methods used for comparison may be fine-tuned on the dataset used for the disclosed depth estimation method using cross-spectral matching method for fair comparison.

Depth Reconstruction

Figure 8:
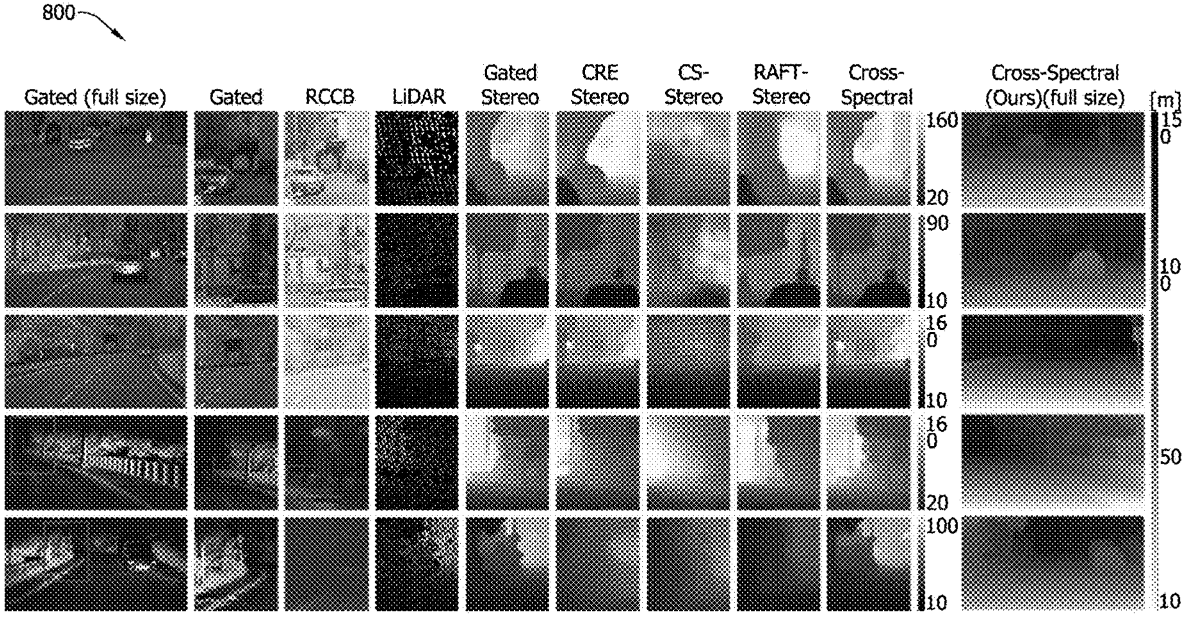
FIG. 8 is an illustration of qualitative comparison of the disclosed depth estimation method using cross-spectral gated-RGB stereo and other existing methods.

FIG. 8 is an illustration of qualitative comparison 800 of the disclosed depth estimation method using cross-spectral gated-RGB stereo and other existing methods. FIG. 9 is an example table 900 showing evaluation of the disclosed depth estimation method using cross-spectral gated-RGB stereo compared to other approaches. Evaluation of the disclosed depth estimation method and competing gated approaches are compared using both supervised and un-supervised approaches. In the table 900, "M" refers to methods that use temporal data for training, S for stereo supervision, "G" for gated consistency and "D" for depth supervision. Best results in each category are shown in table 900 in bold and second best results are shown as underlined. FIG. 10 is an example table 1000 showing evaluation on accumulated LiDAR scans under different lighting conditions for the disclosed depth estimation method using cross-spectral gated-RGB stereo compared to other approaches.

Qualitative comparison 800 shown in FIG. 8 is a comparison of the Gated-RCCB stereo with the known methods for depth estimation. The disclosed depth estimation approach using the Gated-RCCB stereo is unique in its ability to produce consistently accurate and high-detailed depth maps regardless of the ambient illumination condition. The depth maps generated using the disclosed Gated-RCCB stereo includes fine structures such as trees or poles as clearly visible, unlike other known methods that struggle with consistent depth prediction for these elements. For enhanced visibility of distant objects, the color maps used in zoom-ins may be inverted and scaled.

Further, qualitative results presented in FIG. 8 and in tables shown in FIG. 9 and FIG. 10, the disclosed depth estimation method using cross-spectral matching reduces the error by up to about 9.7% and 0.22 m in mean absolute error (MAE) during nighttime conditions and reduces the error by up to about 13.3% and 0.3 in MAE during daytime conditions in comparison with the next best stereo method. Additionally, when the disclosed depth estimation method using cross-spectral matching is compared to the two next-best stereo methods on accumulated LiDAR ground-truth maps which allow assessment up to 220 m, while reducing the error of the next best method averaged over day and night, Gated Sterco, by 16.1% and 1.4 m and CREStereo by 17.1% and 1.7 m. Qualitatively, the improvement from the disclosed depth estimation method using cross-spectral matching is visible in sharper edges and rendering of fine details missed by other known methods. Compared to the two next-best methods, the benefit of the cross-spectral depth estimation is highlighted for fine structures at large distances, as shown in FIG. 11.

Figure 11:
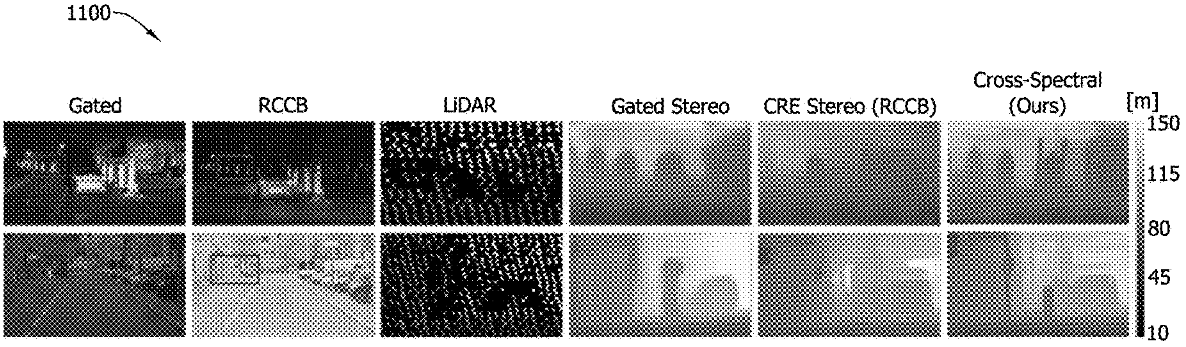
FIG. 11 is an illustration of comparison of a disclosed depth estimation method using cross-spectral gated-RGB stereo to light detection and ranging (LiDAR) and other state-of-the-art methods that rely on a single modality.

FIG. 11 is an illustration of comparison 1100 of a disclosed depth estimation method using cross-spectral gated-RGB stereo to light detection and ranging (LiDAR) and other state-of-the-art methods that rely on a single modality. Gated Stereo (or gated images) and CREStereo (RCCB images) are used for the disclosed depth estimation method, which recovers fine details of distant objects irrespective of daylight and nighttime. Compared to alternative cross-spectral stereo methods like CS-Stereo, the disclosed depth estimation method is visually and quantitatively superior by a wide margin as these methods generally do not display details.

Qualitative Assessment of Lost Cargo Data

Figure 12:
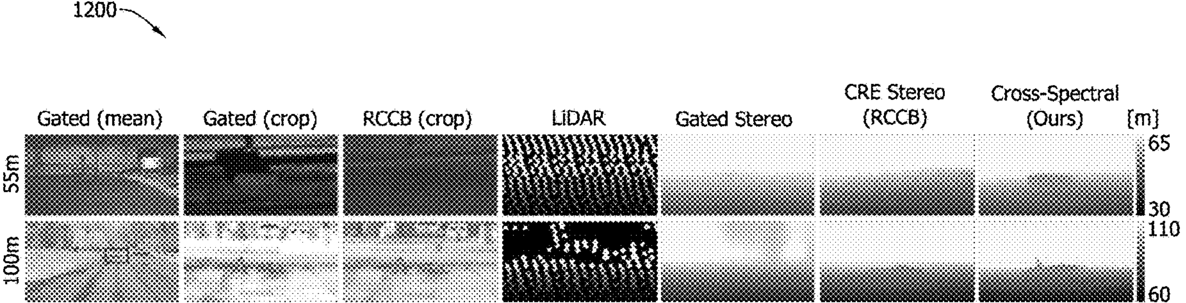
FIG. 12 is an example set of images for small objects at two different distances on ground level.

In some embodiments, the disclosed depth estimation method using cross-spectral matching may be used for focusing on detecting small, potentially hazardous highway objects as shown in FIG. 12.

FIG. 12 is an illustration 1200 of example set of images for small objects at two different distances on ground level. As shown in FIG. 12, depth estimation for "lost cargo" or small objects at far distances on ground level may be lost from preceding vehicles. However, the disclosed depth estimation method using cross-spectral matching estimates accurate depth for these small objects in both daylight and nighttime conditions by integrating complementary RCCB and gated images. Single modality methods suffer from limitations, for example, CREStereo (RCCB) lacks effective illumination at night, and Gated Stereo suffers from poor resolution during the day. This is critical for autonomous driving, where early detection of such "lost cargo" is necessary for safe maneuvering. Traditional LiDAR often lacks the necessary depth detail for small objects, while passive RCCB cameras are effective in daylight but less so in low light. Gated cameras, although useful, struggle in bright conditions and have lower resolution. Additionally, high-resolution RCCB data and precise ToF gated data combined with our cross-spectral gated stereo surpass single-modality sensors in detecting small objects at long distances, an essential capability for advanced autonomous driving systems.

FIG. 13 is an example table showing results of ablation experiments for different modalities on a dataset. In some embodiments, effectiveness of the disclosed depth estimation method using cross-spectral matching may be validated by progressively removing components from the full model as shown in FIG. 13. Ablation Experiments may be performed on the dataset referenced herein above to investigate different resolution, training method, remove components of the disclosed CSM, the MPVIT backbone and test different input modalities. Further, the full model may be validated for achieving the overall best metrics averaged over day and night. First, high-resolution may be removed by downsampling the RCCB image to one third resolution. This leads also to a clear reduction of details in the depth map which cannot be measured quantitatively using sparse LiDAR. To assess the effectiveness of the cross-spectral (CS) training approach, encompassing alternating training, self-supervised losses, and dense LiDAR supervision, this component may be removed and for training with sparse LiDAR supervision only, which results in an increase in MAE by 8.4%. Further simplification may involve omitting the pose refinement step within the disclosed depth estimation method using CSM, which causes an increase in MAE by 2.1%, indicating the effectiveness of these components. Subsequent removal of the attention-based feature fusion mechanism and replacing MPVIT backbone with the backbone from shows an additional decrease in MAE by 7.3% and 9.9%, respectively. Next, the impact of the dual-camera setup, comprising one RCCB and one gated camera may be analyzed. Discarding this setup leads to more than double the MAE, highlighting the importance of the double stereo camera configuration. Ultimately, when reverted to a monocular depth estimation baseline, which records the highest daytime MAE, the value of stereo cues may be further highlighted.

Accordingly, the disclosed cross-spectral method for stereo depth estimation combines active gated NIR and high-resolution HDR RCCB cameras. This approach outperforms existing LiDAR sensors in spatial resolution without compromising depth accuracy, and is effective in varying lighting conditions, with gated NIR ex-celling at night and RCCB cameras in daylight. To combine both modalities, a stereo depth estimation method hinges on a cross-spectral fusion module trained for both supervised and self-supervised losses, achieving depth with superior accuracy and quality, surpassing existing methods that rely on single modalities. Additionally, the disclosed CSM is economically viable as it employs cost-effective CMOS sensors and achieves long-range depth accuracy, improving by 16% in MAE over known methods. Further, the disclosed CMS enables applications like detecting small ground-level objects at long distances under all different lighting conditions.

Figure 14:
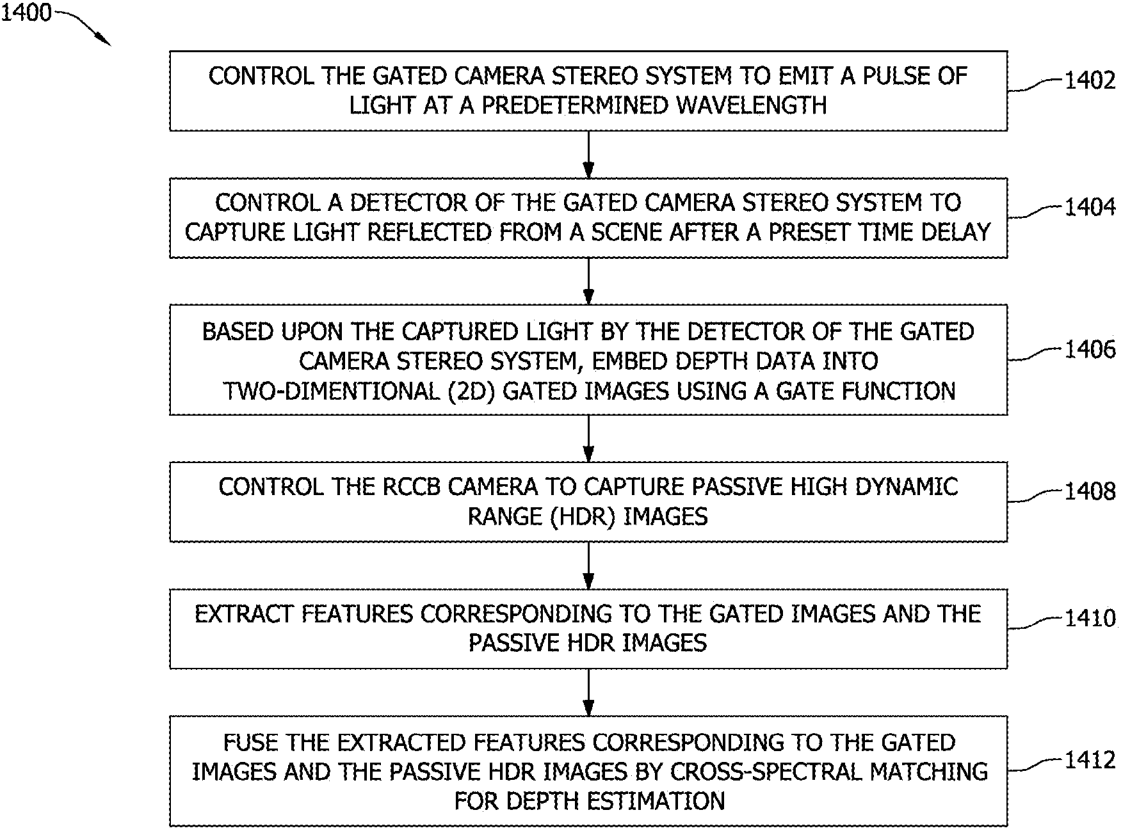
FIG. 14 is a flow-chart of method operations for performing depth estimation as described herein according to some embodiments.

FIG. 14 illustrates an exemplary flow-chart 1400 of method operations performed by an autonomy computing system 200 or a computing system 300. The method operations may include controlling 1402 a gated camera stereo system to emit a pulse of light at a predetermined wavelength. By way of a non-limiting example, the predetermined wavelength may be up to 808 nm. The method operations may include controlling 1404 a detector of the gated camera stereo system to capture light reflected from a scene after a preset time delay and based upon the captured light by the detector of the gated camera stereo system, embedding 1406 depth data into two-dimensional (2D) gated images using a gate function. The gate function is described herein in detail with regards to FIG. 3, and therefore those details are repeated for brevity.

The method operations may include controlling 1408 a RCRB camera to capture passive HDR images, and extracting 1410 features corresponding to the gated images and the passive HDR images. By way of a non-limiting example, the gated camera stereo system and the RCCB camera may have a baseline b of 0.76 m. Further, the RCCB camera may include a passive sensor with a sensitivity spectrum spanning a visible light band of 380 to 1050 nanometer (nm). The passive HDR images may be captured using an exposure time selected based on time of a day or an ambient light condition. By way of a non-limiting example, the exposure time is selected from 21 microseconds (μs) to 108 μs during a daytime or the ambient light condition associated with the daytime, or the exposure time is selected from 805 microseconds (μs) to 1745 μs during a nighttime or the ambient light condition associated with the nighttime.

The method operations may include fusing 1412 the extracted features corresponding to the gated images and the passive HDR images by cross-spectral matching for depth estimation. The cross-matching for depth estimation may include registering the extracted features corresponding to the gated images and the passive HDR images and fusing the registered features corresponding to the gated images and the passive HDR images using an attention mechanism and prior pose refinement. Because the attention mechanism and prior pose refinement are described in detail, those details are not repeated for brevity.

Various functional operations of the embodiments described herein may be implemented using machine learning algorithms, and performed by one or more local or remote processors, transceivers, servers, and/or sensors, and/or via computer-executable instructions stored on non-transitory computer-readable media or medium.

In some embodiments, the machine learning algorithms may be implemented, such that a computer system "learns" to analyze, organize, and/or process data without being explicitly programmed. Machine learning may be implemented through machine learning methods and algorithms ("ML methods and algorithms"). In one exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to images. ML outputs may include, but are not limited to identified objects, items classifications, and/or other data extracted from the images. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of images with known characteristics or features or with a large sample of other data with known characteristics or features. Such information may include, for example, information associated with a plurality of images and/or other data of a plurality of different objects, items, or property.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In some embodiments, generative artificial intelligence (AI) models (also referred to as generative machine learning (ML) models) may be utilized with the present embodiments and may the voice bots or chatbots discussed herein may be configured to utilize artificial intelligence and/or machine learning techniques. For instance, the voice or chatbot may be a ChatGPT chatbot. The voice or chatbot may employ supervised or unsupervised machine learning techniques, which may be followed by, and/or used in conjunction with, reinforced or reinforcement learning techniques. The voice or chatbot may employ the techniques utilized for ChatGPT. The voice bot, chatbot, ChatGPT-based bot, ChatGPT bot, and/or other bots may generate audible or verbal output, text, or textual output, visual or graphical output, output for use with speakers and/or display screens, and/or other types of output for user and/or other computer or bot consumption.

In some embodiments, various functional operations of the embodiments described herein may be implemented using an artificial neural network model. The artificial neural network may include multiple layers of neurons, including an input layer, one or more hidden layers, and an output layer. Each layer may include any number of neurons. It should be understood that neural networks of a different structure and configuration may be used to achieve the methods and systems described herein.

In the exemplary embodiment, the input layer may receive different input data. For example, the input layer includes a first input $a_1$ representing training images, a second input $a_2$ representing patterns identified in the training images, a third input $a_3$ representing edges of the training images, and so on. The input layer may include thousands or more inputs. In some embodiments, the number of elements used by the neural network model changes during the training process, and some neurons are bypassed or ignored if, for example, during execution of the neural network, they are determined to be of less relevance.

In some embodiments, each neuron in hidden layer(s) may process one or more inputs from the input layer, and/or one or more outputs from neurons in one of the previous hidden layers, to generate a decision or output. The output layer includes one or more outputs each indicating a label, confidence factor, weight describing the inputs, an output image, or a point cloud. In some embodiments, however, outputs of the neural network model may be obtained from a hidden layers in addition to, or in place of, output(s) from the output layer(s).

In some embodiments, each layer has a discrete, recognizable function with respect to input data. For example, if n is equal to 3, a first layer analyzes the first dimension of the inputs, a second layer the second dimension, and the final layer the third dimension of the inputs. Dimensions may correspond to aspects considered strongly determinative, then those considered of intermediate importance, and finally those of less relevance.

In some embodiments, the layers may not be clearly delineated in terms of the functionality they perform. For example, two or more of hidden layers may share decisions relating to labeling, with no single layer making an independent decision as to labeling.

Based upon these analyses, the processing element may learn how to identify characteristics and patterns that may then be applied to analyzing and classifying objects. The processing element may also learn how to identify attributes of different objects in different lighting. This information may be used to determine which classification models to use and which classifications to provide.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for depth estimation, the system comprising:
a gated camera stereo system;
a red-clear-clear-blue (RCCB) camera;
at least one memory storing instructions; and
at least one processor communicatively coupled with the at least one memory to execute the stored instructions to:
control the gated camera stereo system to emit a pulse of light at a predetermined wavelength;
control a detector of the gated camera stereo system to capture light reflected from a scene after a preset time delay;
based upon the captured light by the detector of the gated camera stereo system, embed depth data into two-dimensional (2D) gated images using a gate function;
control the RCCB camera to capture passive high dynamic range (HDR) images;
extract features corresponding to the gated images and the passive HDR images; and
fuse the extracted features corresponding to the gated images and the passive HDR images by cross-spectral matching for depth estimation.

2. The system of claim 1, wherein the gated camera stereo system and the RCCB camera both have a baseline b of 0.76 m.

3. The system of claim 1, wherein the predetermined wavelength is up to 808 nm.

4. The system of claim 1, wherein the RCCB camera comprises a passive sensor with a sensitivity spectrum spanning a visible light band of 380 to 1050 nanometer (nm).

5. The system of claim 1, wherein the passive high dynamic range (HDR) images are captured using an exposure time selected based on time of a day or an ambient light condition.

6. The system of claim 5, wherein the exposure time is selected from 21 microseconds (μs) to 108 μs during a daytime or the ambient light condition associated with the daytime.

7. The system of claim 5, wherein the exposure time is selected from 805 microseconds (μs) to 1745 μs during a nighttime or the ambient light condition associated with the nighttime.

8. The system of claim 1, wherein the cross-matching for depth estimation comprises registering the extracted features corresponding to the gated images and the passive HDR images and fusing the registered features corresponding to the gated images and the passive HDR images using an attention mechanism and prior pose refinement.

9. A vehicle comprising:

a gated camera stereo system;

a red-clear-clear-blue (RCCB) camera;

at least one memory storing instructions; and at least one processor communicatively coupled with the at least one memory to execute the stored instructions to:

control the gated camera stereo system to emit a pulse of light at a predetermined wavelength;

control a detector of the gated camera stereo system to capture light reflected from a scene after a preset time delay;

based upon the captured light by the detector of the gated camera stereo system, embed depth data into two-dimensional (2D) gated images using a gate function;

control the RCCB camera to capture passive high dynamic range (HDR) images;

extract features corresponding to the gated images and the passive HDR images; and fuse the extracted features corresponding to the gated images and the passive HDR images by cross-spectral matching for depth estimation.

10. The vehicle of claim 9, wherein the gated camera stereo system and the RCCB camera both have a baseline b of 0.76 m.

11. The vehicle of claim 9, wherein the predetermined wavelength is up to 808 nm.

12. The vehicle of claim 9, wherein the RCCB camera comprises a passive sensor with a sensitivity spectrum spanning a visible light band of 380 to 1050 nanometer (nm).

13. The vehicle of claim 9, wherein the passive high dynamic range (HDR) images are captured using an exposure time selected based on time of a day or an ambient light condition.

14. The vehicle of claim 13, wherein the exposure time is selected from 21 microseconds (μs) to 108 μs during a daytime or the ambient light condition associated with the daytime.

15. The vehicle of claim 13, wherein the exposure time is selected from 805 microseconds (μs) to 1745 μs during a nighttime or the ambient light condition associated with the nighttime.

16. The vehicle of claim 9, wherein the cross-matching for depth estimation comprises registering the extracted features corresponding to the gated images and the passive HDR images and fusing the registered features corresponding to the gated images and the passive HDR images using an attention mechanism and prior pose refinement.

17. A computer-implemented method for depth estimation, the computer-implemented comprising:

controlling a gated camera stereo system to emit a pulse of light at a predetermined wavelength;

controlling a detector of the gated camera stereo system to capture light reflected from a scene after a preset time delay;

based upon the captured light by the detector of the gated camera stereo system, embedding depth data into two-dimensional (2D) gated images using a gate function;

controlling a red-clear-clear-blue RCCB camera to capture passive high dynamic range (HDR) images;

extracting features corresponding to the gated images and the passive HDR images; and fusing the extracted features corresponding to the gated images and the passive HDR images by cross-spectral matching for depth estimation.

18. The computer-implemented method of claim 17, wherein:

the gated camera stereo system and the RCCB camera both have a baseline b of 0.76 m;

the predetermined wavelength is up to 808 nm; and the RCCB camera comprises a passive sensor with a sensitivity spectrum spanning a visible light band of 380 to 1050 nanometer (nm).

19. The computer-implemented method of claim 17, further comprising capturing the passive HDR images using an exposure time selected based on time of a day or an ambient light condition, wherein the exposure time is selected from 21 microseconds (μs) to 108 μs during a daytime or the ambient light condition associated with the daytime, and wherein the exposure time is selected from 805 microseconds (μs) to 1745 μs during a nighttime or the ambient light condition associated with the nighttime.

20. The computer-implemented method of claim 17, wherein the cross-matching for depth estimation comprises registering the extracted features corresponding to the gated images and the passive HDR images and fusing the registered features corresponding to the gated images and the passive HDR images using an attention mechanism and prior pose refinement.

* * * * *